A. W. REDIN.
PISTON PACKING RING.
APPLICATION FILED FEB. 25, 1916.

1,238,191.

Patented Aug. 28, 1917.

Witness:
J. C. Devick.

Inventor:
Andrew W. Redin,
By Miller Chindahl & Parkin
Attys.

UNITED STATES PATENT OFFICE.

ANDREW W. REDIN, OF ROCKFORD, ILLINOIS.

PISTON PACKING-RING.

1,238,191.

Specification of Letters Patent.  Patented Aug. 28, 1917.

Application filed February 25, 1916. Serial No. 80,340.

*To all whom it may concern:*

Be it known that I, ANDREW W. REDIN, a citizen of the United States, residing at Rockford, in the county of Winnebago and State of Illinois, have invented certain new and useful Improvements in Piston Packing-Rings, of which the following is a specification.

My invention relates to improvements in piston-packing rings for use in the cylinders of air, steam, or internal-combustion engines where a pressure-tight packing ring is required.

An object of my invention is to provide a multiple, split piston ring having a large gas-resisting surface, and possessing durability and elasticity, with a minimum number of parts.

Another object is to provide a piston ring which can be readily installed or removed, and which can be easily and cheaply manufactured.

It has long been known that a number of split annular members when placed side by side would increase the seal between the cylinder and the piston. The number of these members which may be used, however, is limited by the friction between the piston and cylinder, necessitating the use of a minimum number of annular members with a maximum sealing capacity. If the members are free to rotate independently the slots will ultimately come together and destroy the seal. Some locking device is therefore necessary to prevent the independent rotation of the annular members. Heretofore, the locking devices have taken the form of binding rings, keys or pins. The latter, in some cases, were cast integral with one ring and restrained the adjacent ring by fitting in a socket provided in said adjacent ring. The present invention prevents relative rotation of the annular members by providing complementary abutting locking shoulders on the respective members of the ring. These shoulders may be formed more cheaply than the locking rings, keys, and pins heretofore employed. With this ring, therefore, not only the number of parts, but the cost of manufacturing, is reduced to a minimum.

Figure 1:
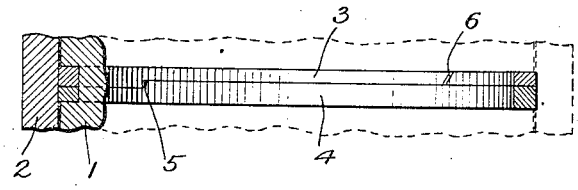
Figure 2:
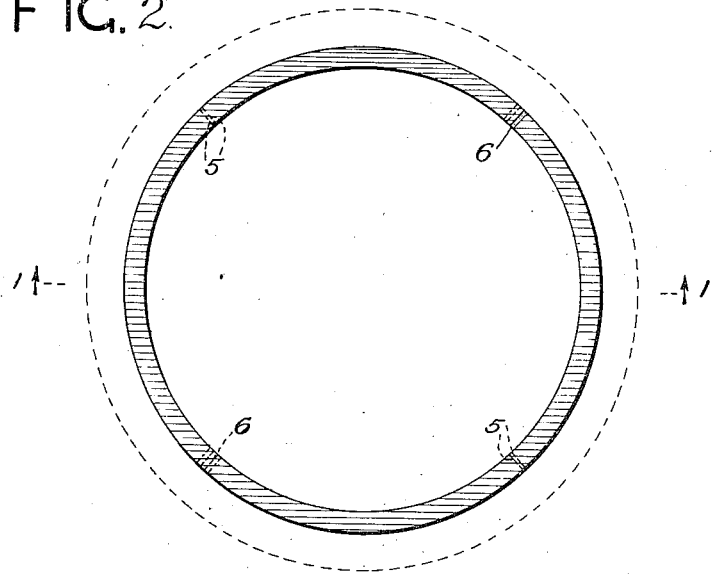
Figure 3:
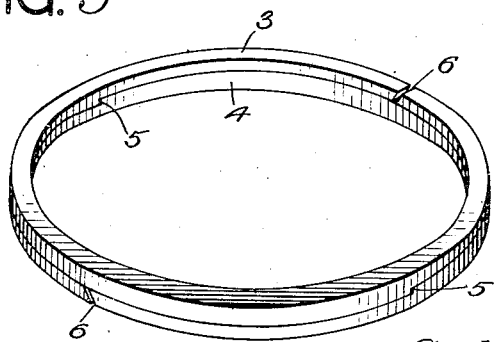

In the accompanying drawings, I have illustrated a duplex piston ring embodying my invention. Figure 1 is a section along line 1—1 of Fig. 2. Fig. 2 is a plan view of the ring compressed within a cylinder. Fig. 3 is a perspective view of the compressed ring.

In Fig. 1, 1 is the piston and 2 is the cylinder of an engine. The piston ring shown consists of two interlocking annular members 3 and 4 which are seated in a groove in the piston and bear against the cylinder wall. Each member 3 and 4 when compressed is of the same outside diameter as the cylinder diameter. For ease of construction, not only of the ring, but also of the seat in the piston, the inside diameters of the members 3 and 4 are preferably equal. Each of the annular members is a duplicate of the other. Each member is a split ring with a semi-circular portion which is of reduced thickness in an axial direction, providing two preferably opposite shoulders 5. Preferably the slot 6 is formed about midway between the shoulders 5 and in the thinner portion of the ring.

The members 3 and 4 when assembled as shown in Fig. 3 interlock, the shoulders 5 limiting relative rotation of said members. By splitting the ring midway between the interlocking shoulders, a double purpose is attained. The elasticity and the strength of the members are increased, since each member is split at the thinner portion and the shoulders are formed at the heavier portion. In the preferred construction, the leaking gases are forced to pass from the slot on the high-pressure side of the ring, around the surfaces in contact, to the shoulders, and thence to the slot on the low-pressure side of the ring, a path of half the circumference between surfaces held in contact by the pressure. In this manner great strength and elasticity and a large effective sealing surface is secured with a minimum number of parts.

I claim as my invention:

A piston-packing ring adapted to completely surround and be carried by a piston, and comprising two substantially similar complementary annular members, each member having a portion of about half the circumference of the member which is reduced in thickness in a direction axial of the ring to provide two integral shoulders located approximately diametrically opposite each other, the thicker portion of each member being of uniform thickness in an axial direction and the thinner portion of the member also being of uniform axial thickness, the thinner portion being split at a point approximately midway between said shoulders, the complementary ends adjacent to the slit lying close together so that each member forms a complete circle, and the two members being associated with the thinner portion of one overlying the thicker portion of the other so that the ring, as a whole, is of uniform axial thickness, the shoulders of the respective members being positioned close together so as to abut against each other to limit relative rotative movement of the two members.

In testimony whereof, I hereunto set my hand.

ANDREW W. REDIN.

In the presence of—
O. M. GRIP,
K. L. SWENSON.